United States Patent [19]

Gagarin

[11] 4,108,286

[45] Aug. 22, 1978

[54] BRAKE DISC FOR AN AXLE OF A RAILWAY VEHICLE

[75] Inventor: Gregory G. Gagarin, Chevy Chase, Md.

[73] Assignee: Knorr-Bremse GmbH, Munich, Fed. Rep. of Germany

[21] Appl. No.: 795,130

[22] Filed: May 9, 1977

[30] Foreign Application Priority Data

Sep. 3, 1976 [DE] Fed. Rep. of Germany ....... 2644223

[51] Int. Cl.² ............................................. F16D 65/12
[52] U.S. Cl. ............................................. 188/218 XL
[58] Field of Search ........ 188/58, 59, 206 R, 218 XL; 192/107 R

[56] References Cited

FOREIGN PATENT DOCUMENTS

| 35,473 | 11/1965 | German Democratic Rep. ..... 188/218 XL |
| 1,151,276 | 7/1963 | Fed. Rep. of Germany .... 188/218 XL |
| 1,945,934 | 3/1971 | Fed. Rep. of Germany .... 188/218 XL |

Primary Examiner—Duane A. Reger
Attorney, Agent, or Firm—Edmund M. Jaskiewicz

[57] ABSTRACT

A brake disc for an axle of a truck of a railway vehicle comprises a brake disc annular element mounted on a hub by a plurality of clamping sleeves seated in radially opposed bores in the hub and annular element. In the regions of the clamping sleeves the hub or annular element is provided with circumferentially spaced lugs which are received in circumferentially extending grooves in radial extensions on the other of the hub or annular element. Radial recesses are provided on the other of the hub or annular element between the clamping sleeves to accommodate the lugs in an axial direction when assembling the annular element upon the hub.

5 Claims, 2 Drawing Figures

U.S. Patent  Aug. 22, 1978  4,108,286
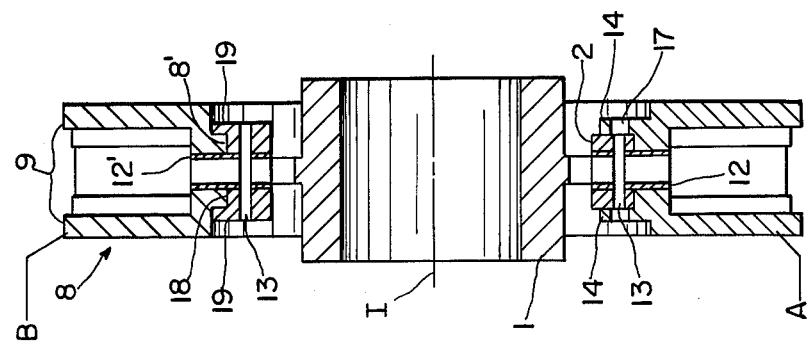
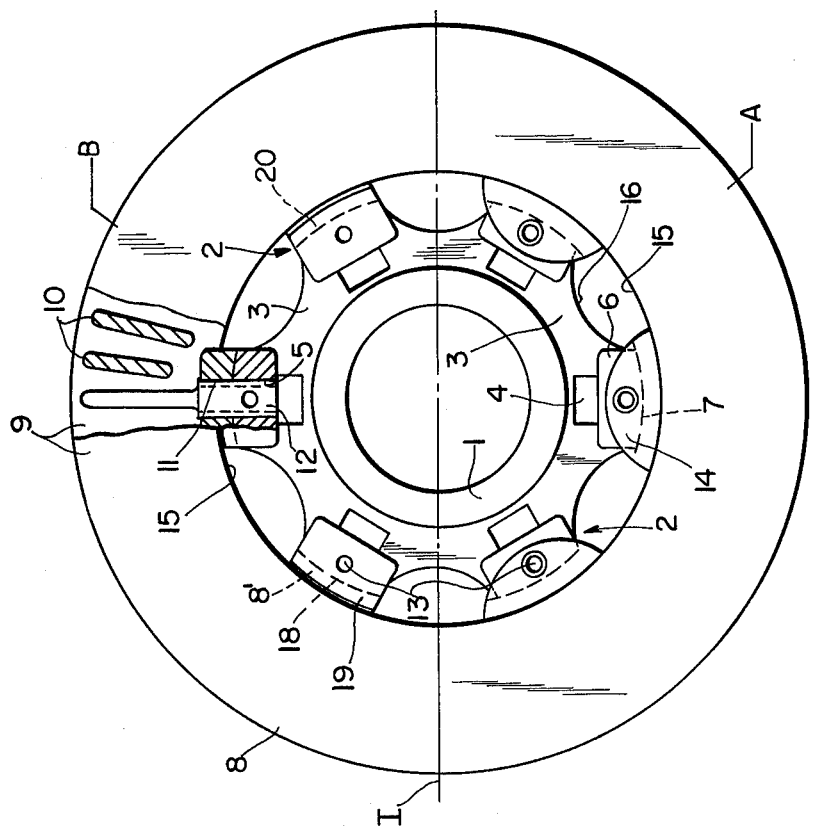

BRAKE DISC FOR AN AXLE OF A RAILWAY VEHICLE

The present invention relates to a brake disc for mounting on the axle of a truck of a railway vehicle, more particularly to the mounting of the annular element upon the hub.

In disc brakes for railway vehicles the brake discs may be constructed so as to be mounted upon the axles of the trucks. Such a brake disc is shown in U.S. Pat. No. 3,926,285 and comprises a hub which is mounted directly upon the axle and a friction-ring annular portion radially surrounding the hub. The hub and annular element are interconnected by circumferentially spaced radially extending clamping sleeves seated in aligned bores formed in the hub and annular element. The clamping sleeves are secured in position by cross-pins that are inserted into the hub in parallel with the axis of the hub and passed transversely through the sleeves. Also, clamping sleeves have been secured by a bolt passing through the sleeve and washers on both ends of the sleeve. A castellated nut is on the bolt end in an open area of the hub and secured by a cotter pin through a transverse bore in the bolt.

Such axle mounted brake discs are subjected to large axial forces between the annular element and the hub generally because of shocks and impacts produced by the movement of the vehicle or by the forces exerted in an axial direction by the brake shoes. As result of such axial forces, the radially positioned clamping sleeves are compressed within the limits of their radial elasticity to smaller diameters and thus permit some axial displacement to occur between the annular element and the hub. Additional lateral displacement of the annular element with respect to the hub will bend the sleeves out of the radial plane and into oblique positions wherein the sleeves may be so damaged in the boundary area between the annular element and the hub that the openings of the bores in which the sleeves are seated are damaged so as to impair the proper functioning of the clamping sleeves. In addition, as the annular element moves axially with respect to the hub, the clamping sleeve is subjected to shear stresses and because of its resilience the sleeve will bend. The bending of the sleeve will cause one end thereof to be pushed downwardly toward the axle so as to subject the cross-pins retaining the sleeves in the hub to considerable stress. The cross-pins have been actually broken or sheared as result of such lateral or axial movement of the annular element with respect to the hub.

It is therefore the principal object of the present invention to provide a novel and improved brake disc for mounting on the axle of a truck of a railway vehicle.

It is another object of the present invention to provide such a brake disc having an improved mounting or interconnection between the brake disc annular element and the hub.

It is a further object of the present invention to provide such a brake disc wherein the radial clamping sleeves are relieved of excessively high axial forces between the annular element and the hub.

It is an additional object of the present invention to provide such a brake disc wherein any axial displacement between the annular element and the hub is limited so as not to subject the clamping sleeve to high-stress-conditions wherein the sleeve could be damaged or shifted out of its radial plane.

According to one aspect of the present invention such a brake disc may comprise a brake disc annular element mounted radially on a hub and there being a plurality of circumferentially spaced cam portions on either the hub or annular element and extending radially toward the other. The outer surfaces of the cam portions define a cylinder. The other of the hub and annular element has a plurality of circumferentially spaced extensions which extend radially toward the cam portions and the extensions each have circumferentially extending grooves therein to receive the cam portions. Clamping sleeves are seated in radially opposed bores in the cam portions and radial extensions to interconnect the annular element and the hub. The other one of the hub and annular element is provided with radial recesses between the clamping sleeves and the recesses are shaped to accommodate the cam portions in an axial direction.

As result of the present invention, when high axial displacement forces exist between the annular element and the hub so as to compress the clamping sleeves to a certain extent, the lateral faces of the cam portions will contact walls of the grooves in the radial extensions so that any additional axial stresses are transmitted between the annular element and the hub so as to by-pass the clamping sleeves. The stressing of the clamping sleeves in an axial direction is thus limited and the risk of damage to the clamping sleeves, the bore openings or the cross-pins is virtually eliminated. The radial recesses are employed for the assembly of the annular element upon the hub. The cam portions on the hub or annular element are inserted axially through the recesses and by a pivoting of the hub and annular element with respect to each other the cam portions are then introduced in a circumferential direction into the respective grooves until the bores for the clamping sleeves are aligned.

Other objects and advantages of the present invention will be apparent upon reference to the accompanying description when taken in conjunction with the following drawings, which are exemplary, wherein;

FIG. 1 is an elevational view with portions thereof in section of a brake disc according to the present invention wherein an embodiment A is illustrated below the axial line I and a modification B is illustrated above the axial line I; and FIG. 2 is a radial sectional view through the brake disc of FIG. 1 illustrating the same embodiment and modification thereof.

Proceeding next to the drawings wherein like reference symbols indicate the same parts throughout the various views a specific embodiment and modifications of the present invention will be desribed in detail.

As may be seen in FIG. 1, a hub 1 which is mounted directly on the axle of a truck of a railway vehicle in a known manner has on its circumference a number, which in this embodiment is six, of uniformly spaced radially extending lugs 2 which are connected to each other and reinforced by means of circumferentially extending reinforcing ribs 3 between the lugs. Each lug has in its radially inner end an axially extending hole 4 which functions as an outlet for a radial bore 5 formed in each of the lugs. In embodiment A, each lug is provided with side or lateral faces 6 each of which is disposed in a radial plane. The radially outer surfaces 7 of the lugs 2 are shaped so as to define a cylinder.

An annular element 8 having lateral surfaces against which brake shoes are applied in opposite directions has its inner circumference spaced radially a very small distance from the outer surfaces 7 of the hub 1. The annular element 8 comprises two axially spaced annular members 9 which define the friction surfaces and these members are interconnected by a plurality of radially extending ribs or webs 10 which also define radially extending ventilating passages therebetween. The annular element 8 has a plurality of radially extending bores 11 which are aligned with the bores 5 of the hub 1 when the annular element and hub are assembled as illustrated. Radially extending clamping or expansion sleeves 12 are aserted into each pair of aligned bores 5 and 11 so as to interconnect the hub and annular element 8. The sleeves 12 are secured in position by means of cross-pins 13 that pass transversely through the lugs 2 and the clamping sleeves 12.

The annular element 8 of embodiment A is provided with a plurality of radially inwardly projecting extensions 14 from its inner circumferential surface 15. The projections 14 are positioned in pairs and spaced axially in the vicinity of the lugs 2 and positioned to overlap the lugs 2 on both sides 6 thereof with a small play as may be seen in the lower portion of FIG. 2. Each pair of extensions 14 thus form a section of a circumferentially extending groove in which is seated a lug 2 in a manner of a cam. The reinforcing ribs 3 of hub 1 are provided with radially inwardly directed recesses 16 between the lugs 2 and the recesses conform in shape to the extensions 14 so as to accommodate the extensions 14 in an axial direction.

To assemble the brake disc, the annular element 8 is slipped axially over the hub 1 with the hub 1 being pivoted with respect to the annular element at an angle which is one-half of the angle between two successive lugs 2 on the hub. The extensions 14 are thus slid axially through corresponding recesses 16 subsequent to which the annular element 8 is pivoted with respect to the hub by the abovementioned angle until the bores 11 and 5 are aligned. During this pivoting, the lugs 2 are positioned in the grooves formed by the spaced pairs of extensions 14. The clamping sleeves 12 are then inserted and secured in position by the cross-pins 13. In order to permit the insertion of the cross-pins when they are positioned in the radially outer area of lugs 2 overlapped by the extensions 14 axial bores 17 are provided in at least one extension 14 of each pair of extensions to enable the cross-pins 13 to be introduced through the bores 17.

It is preferable that the axial play of the lugs 2 in the grooves between the pairs of extensions 14 is less than the maximum displacement between the hub and annular element in the axial direction as determined by the radial elasticity of the clamping sleeves. This relationship avoids excessive stressing of the clamping sleeves and the clamping sleeves will thus always remain in a radial plane. Accordingly, damage to the bore openings is eliminated and the cross-pins are secured against damage.

When the vehicle provided with the brake discs according to the present invention is traveling and axial forces caused by shocks and impacts appear between the hub 1 and annular element 8 with the forces being oriented parallel with the axial direction of the brake disc, such axial forces will compress somewhat the clamping sleeves 12 radially within the limits of their elasticity and the diameters of the clamping sleeves will be slightly reduced. However, because a slight axial displacement between the hub and annular element is provided for, the clamping sleeves 12 will remain in their radial directions and will retain their positions in a radial plane. Should sufficient axial displacement between the hub and annular element occur so that the inner surfaces of extensions 14 contact side-walls 6 of the lugs 2, any further axial displacement of the hub and annular element will be positively prevented. Any subsequent forces which would tend to cause such further axial displacement will then be transmitted between the annular element 8 and the hub 1 through the contacting surfaces of the radial extensions 12 and lugs 2.

Because of the relationship between the axial play of lugs 2 with respect to extensions 14 and the radial elasticity of the sleeves 12 as described above, the frequency of contact between the extensions 14 and the lugs 2 will be minimized. This contact is exclusive of the resilient interconnection desirable between the hub and annular element and obtained by the clamping sleeves 12. Thus, the radial extensions 14 will abut the lugs 2 only after the radial elasticity of the clamping sleeves 12 will be almost completely exceeded.

A modification of the above described embodiment is indicated at B in the upper portions of both FIGS. 1 and 2. In this modification, the lugs 2 of the hub 1 are each provided with a pair of axially spaced cams 19 on opposed axially positioned faces of the lugs. The cams 19 extend radially outwardly beyond an outer cylindrical surface 18 defined by the outer surfaces of the lugs 2. The cams 19 are curved in the circumferential direction of the hub to conform substantially to the inner circumferential surface 15 of annular element 8 and the lateral surfaces of the cams 19 are positioned in a radial plane of a projection 8' on the inner circumference 15 of the annular element 8. The pairs of cams 19 thus form the side-walls of a plurality of circumferentially extending grooves 20. Reinforcing ribs 3 are also provided between the lugs 2 but need not correspond in shape to the shapes of the cams 19. The radial projections 8' do not extend into the areas between the lugs 2 and thus present an interrupted annular ring on the inner circumferential surface 15.

This modification of the brake disc is similarly assembled by axially slipping the annular element 8 turned by a half angle of the angle between the lugs 2 unto the hub 1 and then pivoting the annular element 8 to introduce the projections 8' into grooves 20 until bores 5 and 11 are aligned. The clamping sleeves 12 are then inserted and secured by cross-pins 13 as described above. The function of the assembled brake disc corresponds to that of the embodiment as described above.

It is thus apparent that according to the present invention either the hub or the annular element can be provided with a radial projection which is received into a corresponding circumferentially extending groove formed on the other of the hub or annular element. The resulting structure thus limits the lateral or axial movement of the annular ring with respect to the hub but still permits sufficient space for thermal expansion which occurs during braking. The clamping or expansion sleeves are thus not subjected to the high-stress condition which could result in damage or destruction of the sleeves. Thus, the axial movement between the hub and the annular element according to the present invention is sufficient for thermal expansion but is limited so as not to subject the sleeves to the undue axial stresses as described above. The cross-pins also are thus prevented from being subjected to unusually large bending moments which may occur should the assembled annular element and hub be subjected to lateral or axial shocks or impacts.

It is further apparent that the present invention is applicable to various arrangements and structures for securing a sleeve to a hub and friction-ring including but not limited to the structures described above.

It will be understood that this invention is susceptible to modification in order to adapt it to different usages and conditions, and accordingly, it is desired to comprehend such modifications within this invention as may fall within the scope of the appended claims.

What is claimed is:

1. A brake disc adapted to be mounted on the axle of a railway vehicle and comprising a hub, a brake disc annular element mounted radially on said hub, a plurality of circumferentially spaced cam portions on one of said hub and annular element and extending radially toward the other, the outer surfaces of said cam portions defining a cylinder, a plurality of circumferentially spaced extensions on the other of said hub and annular element and extending radially toward said cam portions and having circumferentially extending grooves thereon to receive said cam portions, a plurality of clamping sleeves seated in radially opposed bores on said cam portions and radial extensions, the other of said hub and annular element having radial recesses therein between said clamping sleeves shaped to accommodate said cam portions on an axial direction such that the annular element is assembled axially over the hub.

2. A brake disc as claimed in claim 1 wherein said cam portions comprise radial lugs on said hub, said extensions being on said annular element and each having axially spaced lips to overlap opposed faces of each lug.

3. A brake disc as claimed in claim 1 wherein the axial play of the cam portions in their grooves is less than the maximum axial displacement between said hub and annular element within the radial elasticity limit of said clamping sleeves.

4. A brake disc as claimed in claim 1 wherein said radial recesses extend to the bases of said grooves.

5. A brake disc as claimed in claim 1 wherein said cam portions comprise lugs on said annular element and said extensions are on said hub and each has axially spaced lips to overlap opposed faces of each lug.

* * * * *